(12) United States Patent
Nauka et al.

(10) Patent No.: US 11,840,031 B2
(45) Date of Patent: *Dec. 12, 2023

(54) RADIATION AMOUNT DETERMINATION FOR AN INTENDED SURFACE PROPERTY LEVEL

(71) Applicant: Hewlett-Packard Development Company, L.P., Spring, TX (US)

(72) Inventors: Krzysztof Nauka, Palo Alto, CA (US); Andrew E. Fitzhugh, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/513,744

(22) Filed: Oct. 28, 2021

(65) Prior Publication Data

US 2022/0048259 A1    Feb. 17, 2022

Related U.S. Application Data

(63) Continuation of application No. 16/075,671, filed as application No. PCT/US2017/019993 on Feb. 28, 2017, now Pat. No. 11,167,510.

(51) Int. Cl.
*B29C 71/04*    (2006.01)
*B33Y 50/00*    (2015.01)
(Continued)

(52) U.S. Cl.
CPC .......... *B29C 71/04* (2013.01); *B29C 35/0805* (2013.01); *B29C 59/165* (2013.01);
(Continued)

(58) Field of Classification Search
CPC ..... B29C 64/386; B29C 64/393; B29C 71/04; B29C 64/188; B33Y 50/00; B33Y 50/02
(Continued)

(56) References Cited

U.S. PATENT DOCUMENTS 4,466,080 A    8/1984    Swainson et al.
4,471,470 A    9/1984    Swainson et al.
(Continued)

FOREIGN PATENT DOCUMENTS

CN    1440307    9/2003
CN    1932046    3/2007
(Continued)

OTHER PUBLICATIONS

Pan Y. et al, Meniscus Process Optimization for Smooth Surface Fabrication in Stereolithography, 2016,< http://isi-dl.com/downloadfile/47996 >, (13 pages).
(Continued)

*Primary Examiner* — Atul P. Khare
(74) *Attorney, Agent, or Firm* — SHOOK, HARDY & BACON L.L.P.

(57) ABSTRACT

According to examples, an apparatus includes a processor and a memory on which is stored machine readable instructions. The instructions may cause the processor to identify an intended surface property level for a surface of a three-dimensional (3D) object, determine an amount of radiation to be applied as a flash of radiation onto the surface to obtain the intended surface property level, and output the determined amount of radiation to be applied as a flash of radiation, in which a radiation source is to flash apply the determined amount of radiation onto the surface of the 3D object.

18 Claims, 5 Drawing Sheets

(51) Int. Cl.

| | |
|---|---|
| *B29C 64/118* | (2017.01) |
| *B29C 64/386* | (2017.01) |
| *B29C 64/393* | (2017.01) |
| *B29C 64/30* | (2017.01) |
| *B29C 35/08* | (2006.01) |
| *B29C 59/16* | (2006.01) |
| *B33Y 50/02* | (2015.01) |
| *B33Y 80/00* | (2015.01) |
| *B33Y 40/20* | (2020.01) |

(52) U.S. Cl.
CPC .......... *B29C 64/118* (2017.08); *B29C 64/30* (2017.08); *B29C 64/386* (2017.08); *B29C 64/393* (2017.08); *B33Y 50/00* (2014.12); *B33Y 50/02* (2014.12); *B29C 2035/0833* (2013.01); *B29C 2035/0838* (2013.01); *B33Y 40/20* (2020.01)

(58) Field of Classification Search
USPC ...................................................... 425/174.4
See application file for complete search history.

(56) References Cited

U.S. PATENT DOCUMENTS

| | | | |
|---|---|---|---|
| 4,575,330 A | 3/1986 | Hull | |
| 5,182,056 A | 1/1993 | Spence et al. | |
| 7,878,644 B2 * | 2/2011 | LaFleche | B41J 11/00214 |
| | | | 347/101 |
| 8,497,995 B2 | 7/2013 | Ota et al. | |
| 8,653,409 B1 | 2/2014 | Sodhi | |
| 8,974,727 B2 | 3/2015 | Abe et al. | |
| 9,150,032 B2 | 10/2015 | Roof | |
| 9,469,807 B2 | 10/2016 | Agrawal | |
| 9,987,801 B2 | 6/2018 | Littlefield | |
| 10,933,588 B2 | 3/2021 | Adzima | |
| 11,014,306 B2 | 5/2021 | Wright | |
| 11,104,069 B2 * | 8/2021 | Nauka | B23K 26/0006 |
| 11,167,510 B2 * | 11/2021 | Nauka | B33Y 50/02 |
| 11,207,838 B2 * | 12/2021 | Huang | B33Y 50/00 |
| 11,568,096 B2 * | 1/2023 | Puigardeu Aramendia | |
| | | | G06F 30/12 |
| 2004/0217095 A1 | 11/2004 | Herzog | |
| 2005/0150878 A1 | 7/2005 | Thomas | |
| 2014/0202997 A1 | 7/2014 | Vadali et al. | |
| 2014/0217058 A1 * | 8/2014 | Boegli | B23K 26/0624 |
| | | | 216/9 |
| 2014/0314995 A1 * | 10/2014 | Liu | B23K 26/009 |
| | | | 219/121.72 |
| 2015/0044425 A1 | 2/2015 | Iwashita et al. | |
| 2015/0165675 A1 * | 6/2015 | Dawson | B29C 64/343 |
| | | | 264/129 |
| 2015/0246415 A1 * | 9/2015 | Hosseini | B23K 26/53 |
| | | | 65/102 |
| 2016/0128433 A1 | 5/2016 | Downing | |
| 2016/0332366 A1 | 11/2016 | Donovan | |
| 2017/0304894 A1 | 10/2017 | Buller | |
| 2019/0151946 A1 * | 5/2019 | Zhao | B22F 12/49 |
| 2020/0376754 A1 * | 12/2020 | Lambrecht | B29C 64/30 |
| 2021/0260842 A1 * | 8/2021 | Von Wallfeld | B29C 45/16 |

FOREIGN PATENT DOCUMENTS

| | | | | |
|---|---|---|---|---|
| CN | 101626881 | | 1/2010 | |
| JP | 2000039302 | | 2/2000 | |
| JP | 2015229339 | | 12/2015 | |
| KR | 20160038647 | | 4/2016 | |
| WO | WO-2005032756 A1 * | 4/2005 | ......... B23K 26/0075 |
| WO | WO-2015095742 | | 6/2015 | |
| WO | WO-2015108552 A1 * | 7/2015 | ............. B29C 64/00 |

OTHER PUBLICATIONS

Supplemental European Search Report and Written Opinion dated Oct. 13, 2020 EP Application No. 17899171. (Year: 2020).

* cited by examiner

RADIATION AMOUNT DETERMINATION FOR AN INTENDED SURFACE PROPERTY LEVEL

PRIORITY

This application is a Continuation of commonly assigned and co-pending U.S. patent application Ser. No. 16/075,671, filed Aug. 6, 2019, which claims priority to PCT Application Serial No. PCT/US2017/019993, filed Feb. 28, 2017, entitled "RADIATION AMOUNT DETERMINATION FOR AN INTENDED SURFACE PROPERTY LEVEL", the disclosures of which are hereby incorporated by reference in their entireties.

BACKGROUND 3D manufacturing apparatuses that employ additive manufacturing techniques to build or print parts are gaining in popularity and use. The additive manufacturing techniques typically employ a layering process in which particles of build material are spread into a layer and selectively fused together. Following that process, additional particles are spread into another layer and fused together. This process may be repeated for a number of times to build up a 3D part having a desired configuration.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are apparatuses and methods for determining an amount of radiation to be applied as a flash of radiation onto a surface of a 3D object (or equivalently, an object that has been 3D printed) to cause the surface to have an intended surface property level. The apparatuses and methods disclosed herein may also include the determined amount of radiation being outputted and/or a radiation source being controlled to apply the flash of radiation at the determined amount of radiation. The determined amount of radiation may include the intensity level (e.g., power level) and the duration at which the radiation is to be flash applied. In examples, the radiation is applied as a flash of radiation, e.g., as a burst of radiation that lasts for a short duration of time. By way of particular example, the burst of radiation may be applied for a duration of time that is less than about 2 seconds and in other examples, less than about 100 ms. Additionally, the term "radiation" as used herein may be defined as a region of electromagnetic spectrum that is to raise the temperature of the irradiated material when the material absorbs the electromagnetic spectrum.

Applying a flash of radiation onto a surface of a 3D object, e.g., a 3D object that has recently or previously been fabricated, may cause a thin region along the surface of the 3D object to melt and flow. The degree to which the material on the surface melts and flows may vary depending upon the amount of radiation that is flash applied onto the surface. By varying the amount of radiation that is flash applied onto the surface through implementation of the apparatuses and methods disclosed herein, the surface of the 3D object may be tuned to have the intended surface property level. For instance, the amount of radiation may be tuned to cause the surface to have a particular surface roughness. In other examples, the amount of radiation may be tuned to cause the surface to have particular texture, sheen, color, electrical conductivity, or the like. The surface property level may also be modified through the determination and placement of a pattern of material onto the surface and the at least partial melting and flowing of the pattern of material.

Through implementation of the methods and apparatuses disclosed herein, 3D objects may be fabricated and/or finished to have intended surface property levels. In other words, the methods and apparatuses disclosed herein may generally enable the surfaces of 3D objects to be tuned to have the intended surface property levels through application of a controlled pulse or flash of radiation.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1:
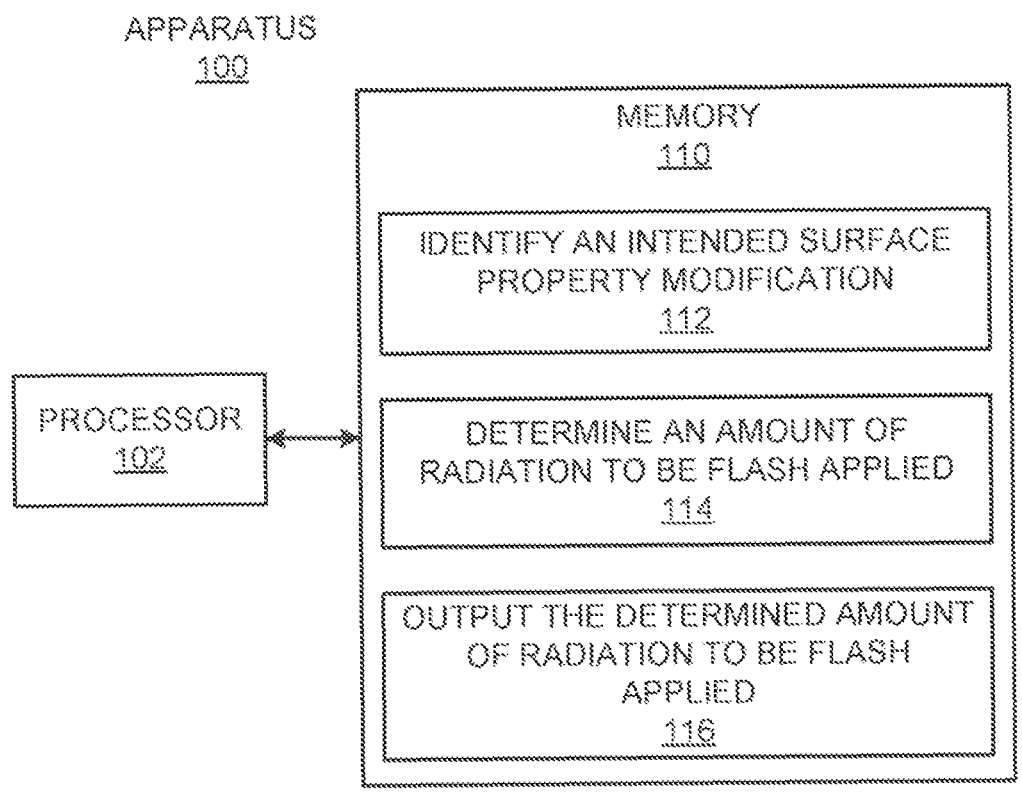
FIG. 1 shows a block diagram of an example apparatus that may determine an amount of radiation to be applied as a flash of radiation onto a 3D object surface to obtain an intended surface property level.

With reference first to FIG. 1, there is shown a block diagram of an example apparatus 100 that may determine an amount of radiation to be applied as a flash of radiation onto a 3D object surface to obtain an intended surface property level. It should be understood that the apparatus 100 depicted in FIG. 1 may include additional components and that some of the components described herein may be removed and/or modified without departing from a scope of the apparatus 100 disclosed herein.

The apparatus 100 may include a processor 102 that may control operations of the apparatus 100. The apparatus 100 may be a computing device such as a personal computer, a laptop computer, a smartphone, a server computer, a tablet computer, or the like. In other examples, the apparatus 100 may be or form part of a 3D fabricating device, a 3D printer, or the like. The processor 102 may be a semiconductor-based microprocessor, a central processing unit (CPU), an application specific integrated circuit (ASIC), a field-programmable gate array (FPGA), and/or other hardware device.

The apparatus 100 may also include a memory 110 that may have stored thereon machine readable instructions 112-116 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to identify an intended surface property level of a surface of a 3D object (which may also equivalently be termed a 3D printed object). The processor 102 may identify the intended surface property level through receipt of instructions from a user to fabricate the 3D object with the intended surface property level. In addition or in other examples, the processor 102 may identify the intended surface property level from instructions stored in a data store. In any regard, the surface property may be a roughness, texture, color, gloss, electrical conductivity, electrical resistivity, combinations thereof, or the like. As such, the intended surface property level may be an intended or defined level of one or more of the surface properties that may be obtained through application of a pulse or flash of radiation onto the surface of the 3D object.

Although particular reference is made herein to the modification of a single surface of the 3D object, it should be understood that the processor 102 may equivalently identify intended surface property levels of multiple surfaces of a 3D object, in which the intended surface property levels may be the same or may differ for the multiple surfaces of the 3D object. Thus, references to a particular surface of the 3D object should be construed as being applicable to additional surfaces of the 3D object.

The processor 102 may fetch, decode, and execute the instructions 114 to determine an amount of radiation to be applied as a flash or pulse of radiation onto the surface of the 3D object to obtain the intended or defined surface property level. The amount of radiation to be flash applied may include an intensity level and a duration at which the radiation is to be applied as a flash or pulse onto the surface to cause the materials on the surface to melt and flow to a particular degree and result in the surface having the intended or defined surface property level. Thus, for instance, the processor 102 may determine the intensity level, the duration, or both at which the radiation is to be applied to obtain the intended property level. The processor 102 may determine the intensity level in instances in which the duration at which the radiation is to be flash applied is preset. Likewise, the processor 102 may determine duration at which the radiation is to be flash applied in instances in which the intensity level is preset. Moreover, the processor 102 may determine both the intensity level and the duration in instances in which neither the intensity level nor the duration is preset. For instance, the intensity level or the duration may be preset for a particular type of radiation source.

The processor 102 may access data that identifies correlations between intensity levels, durations, and surface property levels to identify the intensity level, the duration, or both at which the radiation to be flash applied. The data may identify, for instance, for a particular type of material or for multiple types of material, e.g., plastics, polymers, etc., used in the 3D printing of objects, multiple surface property levels resulting from application of flashes of radiation at different intensity levels and for different durations. That is, the data may include correlations between the surface property levels prior to and following application of a flash of radiation onto surfaces of 3D objects that have been 3D printed. The correlations may also be based upon a particular type of radiation source. By way of example, the radiation source may be one of a xenon lamp, a quartz tungsten halogen lamp, a laser, or the like, and the radiation may be in the form of light. The flash or pulse of radiation may be active for a particular duration of time between about 200 microseconds (μs) and about 2 seconds (s) and in a particular example, the data may identify the correlations for a flash of radiation that is active for between about 10 ms and about 15 ms.

The data correlating the surface property levels, the intensity levels, and the durations may also include data correlating these features with color. Thus, for instance, the data may identify correlations between different types of materials, different types of radiation sources, different flash durations, different colors, different intensity levels, and surface property levels. The data correlating these features may be determined through testing of various materials, colors, radiation sources, etc., and the results of the testing may be used to incorporate the correlations into data. The data may be stored in the form of a look-up table and the processor 102 may access the look-up table to determine the intensity level, the duration, or both at which the flash of radiation is to be applied. In other examples, the data may be stored in other processor-accessible forms such as graphs, charts, etc.

In order to determine the amount of radiation to be flash applied from the correlating data, the processor 102 may identify or otherwise be instructed with information pertaining to the 3D object surface to be modified, such as the type of material used to form the surface and the color of the surface. The processor 102 may also identify or otherwise be provided with information pertaining to a radiation source that is to apply the flash of radiation onto the surface, such as the type of radiation, the duration of the flash of radiation, etc. The processor 102 may use at least some of this information to determine the amount of radiation to be flash applied onto the surface from the correlating data.

The processor 102 may fetch, decode, and execute the instructions 116 to output the determined amount of radiation to be flash applied onto the surface to obtain the intended surface property level. According to examples in which the apparatus 100 is a computing device, such as a personal computer, a laptop computer, a tablet computer, or the like, the processor 102 may communicate the determined amount of radiation to be flash applied to a device containing a radiation source such that the radiation source may flash apply the determined amount of radiation on to the surface of a 3D object. In other examples in which the apparatus 100 is a device that includes or is in control of a radiation source, the processor 102 may instruct or control the radiation source to apply a flash of radiation at the determined intensity level and duration corresponding to the determined amount of radiation.

Figure 2:
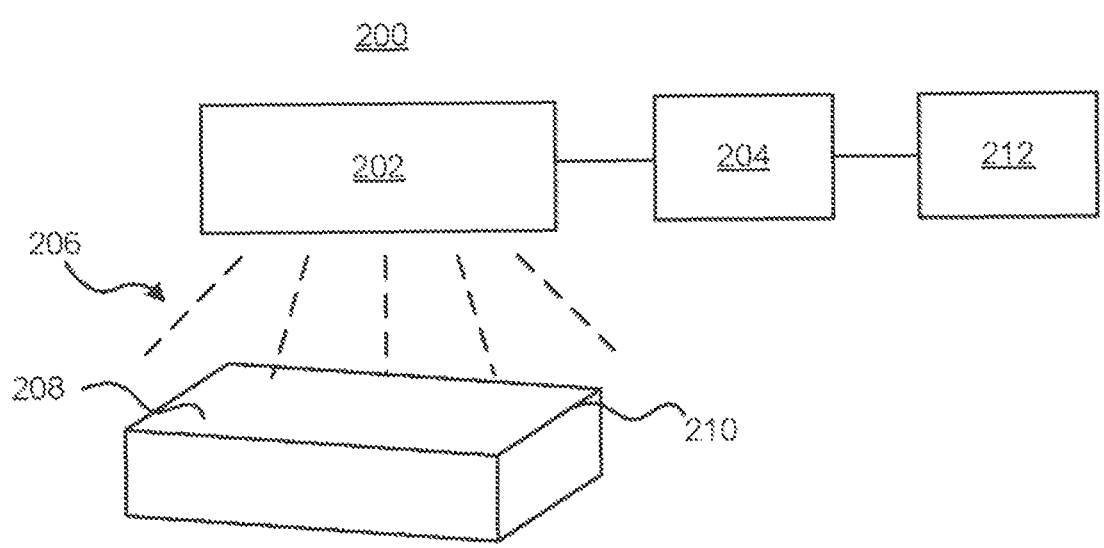
FIG. 2 shows a block diagram of an example apparatus for determining an amount of radiation and applying the determined amount of radiation as a flash of radiation onto a surface of a 3D object.

With reference now to FIG. 2, there is shown a block diagram of an example apparatus 200 that for determining an amount of radiation and applying the determined amount of radiation as a flash of radiation onto a surface of a 3D object. It should be understood that the apparatus 200 depicted in FIG. 2 may include additional components and that some of the components described herein may be removed and/or modified without departing from a scope of the apparatus 200 disclosed herein.

The apparatus 200 may include a radiation source 202 and a processor 204. The radiation source 202 may be a device that is to provide an instantaneous pulse, burst, flash, or sub-flashes of radiation 206 in the form of electromagnetic radiation onto a surface 208 of a 3D printed object 210. In addition or in other examples, the radiation source 202 may apply radiation 206 onto a plurality of surfaces of the 3D object 210 in a substantially simultaneous, homogeneous, and uniform manner. By way of example, the radiation source 202 may be a lamp, such as a xenon lamp, a quartz tungsten halogen lamp, or the like. In another example, the radiation source 202 may be laser or a bank of lasers for which the radiation emitted from the laser or lasers may be diffused and homogenized to provide multidirectional and uniform illumination. In any of these examples, the apparatus 200 may include a plurality of radiation sources 202 to uniformly and simultaneously irradiate one or multiple surfaces 208 of the 3D object 210.

The processor 204 may be equivalent to the processor 102 depicted in FIG. 1 and may be in communication with a memory 212, which may be equivalent to the memory 110 depicted in FIG. 1. As shown, the processor 204 may be a separate component from the radiation source 202. In other examples, however, the processor 204 may be integrated with the radiation source 202. In any regard, the processor 204 may execute instructions stored in the memory 212 to control the radiation source 202 to apply a pulse of radiation 206 onto the surface or surfaces 208 of the 3D object 210, in which the pulse of radiation 206 is tuned to a determined amount of radiation that is to cause the surface to have an intended surface property level as discussed above with respect to FIG. 1. More particularly, the processor 204 may determine the intensity level and duration at which the pulse of radiation 206 is to be applied onto the 3D object 210 to obtain the intended surface property level and may control the radiation source 202 to apply the radiation 106 at the determined intensity level and for the determined duration of time.

Figure 3:
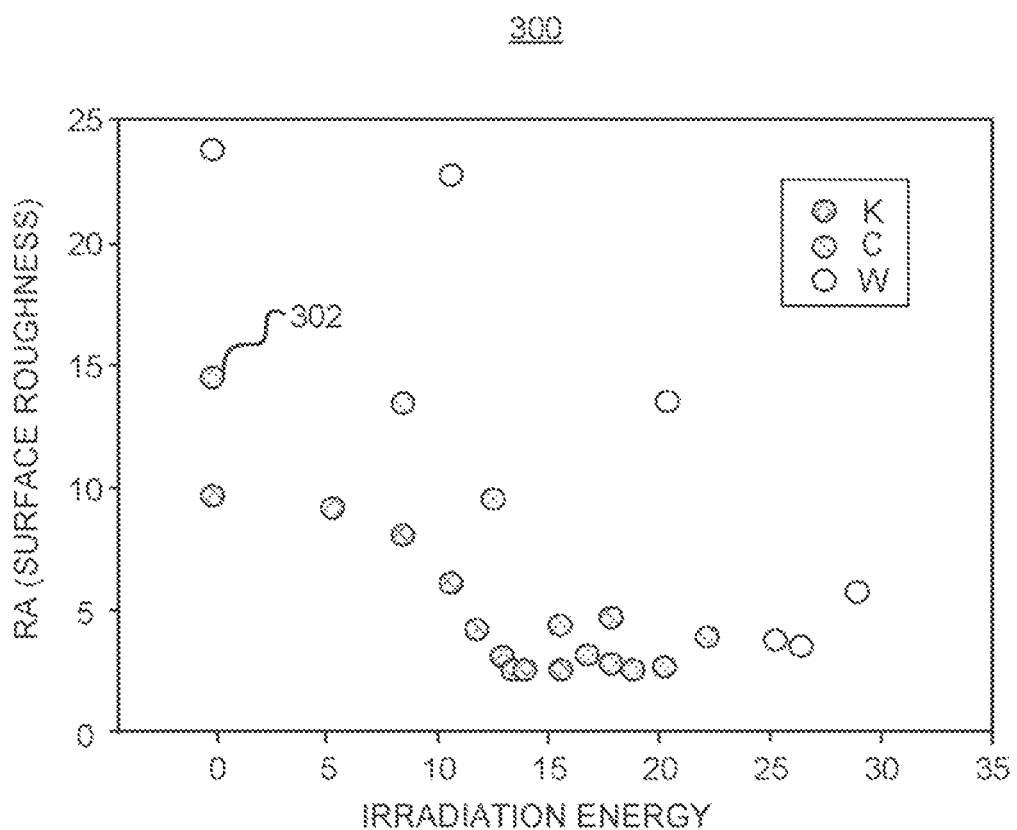
FIG. 3 shows a chart that depicts calibration curves for achieving desired surface roughness for a 3D object printed using Nylon 12.

According to a particular example in which the surface property is a roughness of the surface 208, the intended surface property level may be a surface property level that results in a decrease in the surface roughness of the surface 208 to a certain level. In other examples, the intended surface property level may be a surface property level that results in an increase in the surface roughness of the surface 208. For some materials, such as nylon 12, the roughness of a surface 208 formed using that material may decrease with increasing irradiation energy, but may start to increase beyond a certain energy level as shown in in the chart 300 depicted in FIG. 3. Particularly, FIG. 3 depicts a chart 300 that shows calibration curves for achieving desired surface roughness for a 3D object printed using nylon 12. In FIG. 3, the depicted points 302 indicate surface roughness values corresponding to a pulse of particular irradiation energy applied for a single 10 ms pulse and for different colors of material. That is, FIG. 3 depicts the surface roughness values for black (K), cyan (C), and white (W) colored materials.

Other similar types of charts or correlations may be determined for other types of surface properties such as color, texture, electrical conductivity, tribological properties, etc., through testing on various materials used to fabricate 3D objects.

Figure 4:
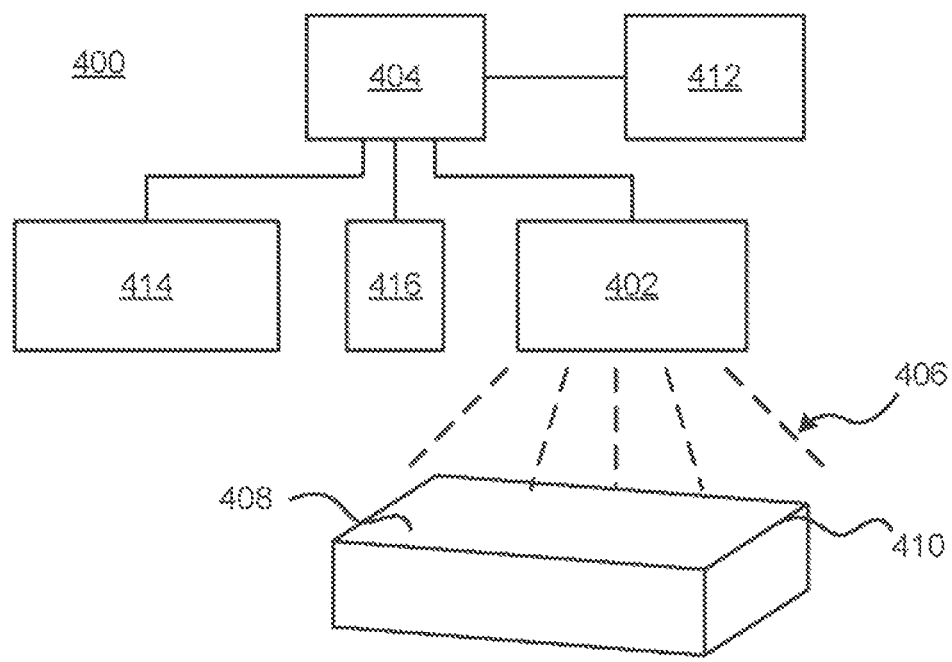
FIG. 4 shows a block diagram of another example apparatus for applying a flash of radiation onto a surface of a 3D object.

According to examples, the apparatus 200 may be part of a finishing device that is to modify the surface property of a 3D object 210 following fabrication of the 3D object 210 by a 3D fabricating device (not shown). Thus, for instance, the 3D object 210 may be positioned beneath the radiation source 202 following fabrication of the 3D object 210 in the 3D fabricating device. In other examples, the apparatus 200, including the radiation source 202 and the processor 204 may be part of a 3D fabricating device and the radiation source 202 may apply the flash of radiation following fabrication of the 3D object 210 and more particularly, immediately following fabrication of the 3D object 210. An example of a 3D fabricating device 400 including a radiation source 402 and a processor 404 is depicted in FIG. 4. As shown in FIG. 4, the radiation source 402 may apply a flash or pulse of radiation 406 onto a surface 408 of a 3D object 410. Additionally, the processor 404 may implement instructions stored in a memory 412 to determine an amount of radiation 406 that is applied to the surface 408 in manners similar to those discussed above with respect to FIG. 1.

The apparatus 400 may also include forming components 414 that may be employed to fabricate the 3D object 410. The forming components 414 may include various components that may be implemented to fabricate the 3D object 410 though any of a number of various additive 3D fabrication techniques. In the example shown in FIG. 4, the processor 404 may control the forming components 414 to fabricate the 3D object 410. For instance, the forming components 414 may include components to fabricate the 3D object 410 through implementation of a powder-based fabrication process in which a fusing agent and fusing energy are applied on layers of a powder material, e.g., a polymer, a plastic, a nylon, or the like material, to fabricate the 3D object 410. In other examples, the forming components 414 may include components to fabricate the 3D object 410 through application of a laser beam onto solid or liquid materials, e.g., the 3D fabricating device may be a selective laser sintering (SLS) device, a selective laser melting (SLM) device, a stereolithography (SLA) device, a fused deposition modeling (FDM) device, a curable liquid photopolymer jetting (Polyjet) device, a 3D binder jetting device, or the like. In any of these examples, the processor 414 may determine the amount of radiation that is to be applied and to control the radiation source 202 to apply the determined amount of radiation following fabrication or as part of the fabrication process of the 3D object 410.

The apparatus 400 may further include a sensor 416 to detect a surface property level of the surface 408 of the 3D object 410. The sensor 416 may be any suitable type of sensor that may be implemented to detect the surface property level. By way of particular example, the sensor 416 may be an optical sensor that may capture an image of the surface 408, a detector that may detect the surface roughness of the surface, or the like. In any regard, the sensor 416 may communicate the detected surface property level and/or an image of the surface 408 to the processor 404. The processor 404 may use the detected surface property level to determine the amount of radiation 406 to be applied to the surface 408. For instance, the data correlating the surface property levels, the intensity levels, and the durations may also include data correlating these features with an initial surface property level. That is, the processor 404 may determine, using the detected surface property level as the initial surface property level, the amount of radiation to be applied from the data.

The sensor 416 may detect the surface property level of the surface 408 following fabrication of the 3D object such that the processor 404 may determine the amount of radiation to be applied onto the fabricated 3D object. The sensor 416 may additionally or alternatively detect the surface property level of the surface 408 following application of a flash of radiation such that the processor 404 may determine a second amount of radiation to be applied in instances in which the first flash of radiation did not sufficiently modify the surface property level, i.e., to obtain the desired surface property level.

Figure 5:
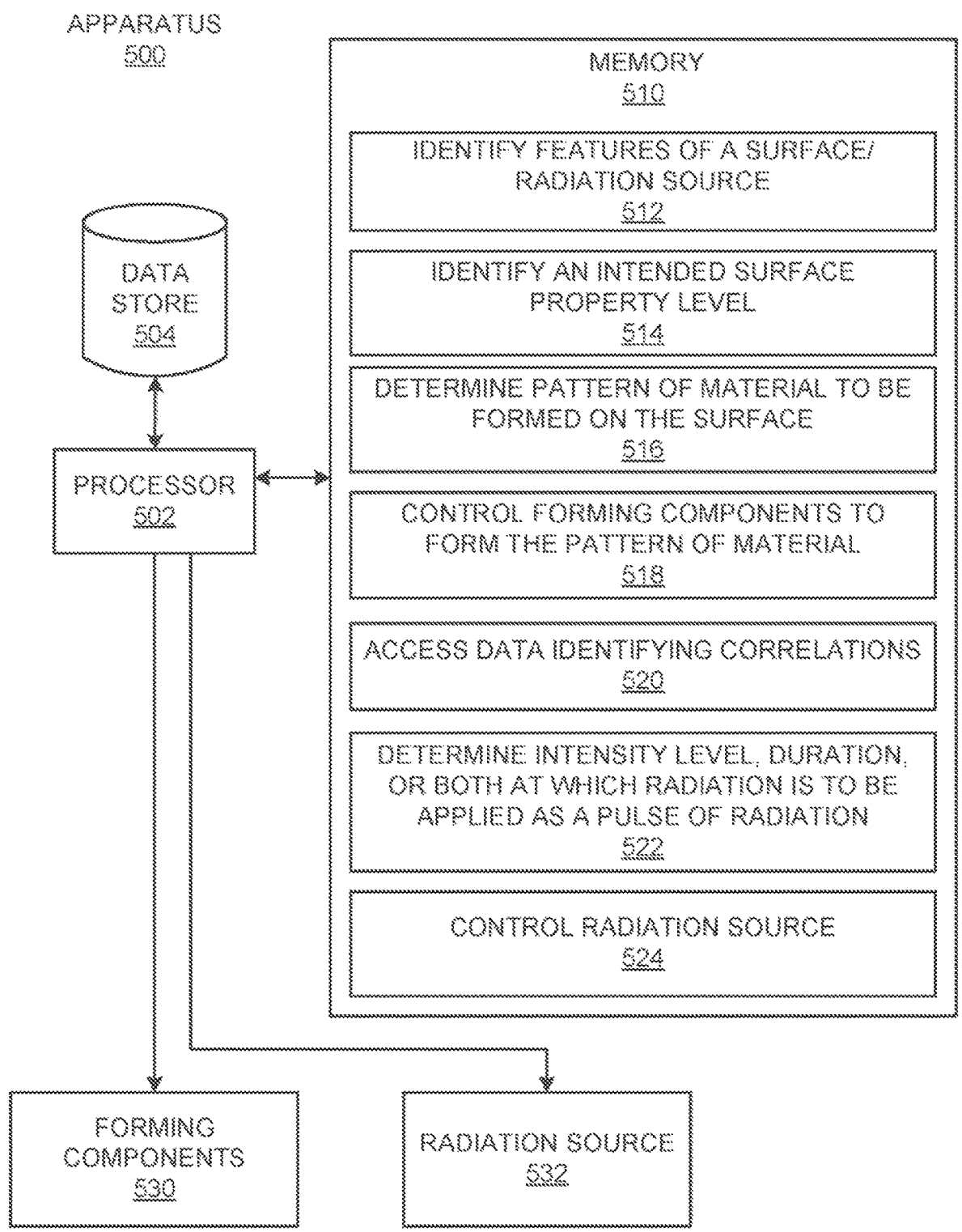
FIG. 5 shows a block diagram of another example apparatus that may determine an amount of radiation to be applied as a flash of radiation onto a 3D object surface to obtain an intended surface property level.

Turning now to FIG. 5, there is shown a block diagram of another example apparatus 500 that may determine an amount of radiation to be applied as a flash of radiation onto a 3D object surface to obtain an intended surface property level. It should be understood that the apparatus 500 depicted in FIG. 5 may include additional components and that some of the components described herein may be removed and/or modified without departing from a scope of the apparatus 500 disclosed herein.

The apparatus 500 may include a processor 502 that may control operations of the apparatus 500. The apparatus 500 may be a computing device such as a personal computer, a laptop computer, a smartphone, a server computer, a tablet computer, or the like. In other examples, the apparatus 500 may be or form part of a 3D fabricating device, a 3D printer, or the like. The processor 502 may be a semiconductor-based microprocessor, a central processing unit (CPU), an application specific integrated circuit (ASIC), a field-programmable gate array (FPGA), and/or other hardware device. The processor 502 may access a data store 504, which may be a Random Access Memory (RAM), an Electrically Erasable Programmable Read-Only Memory (EEPROM), a storage device, an optical disc, and the like. The data store 504 may have stored thereon data pertaining to a 3D object to be printed by the apparatus 500.

The apparatus 500 may also include a memory 510 that may have stored thereon machine readable instructions 512-524 (which may also be termed computer readable instructions) that the processor 502 may execute. The memory 510 may be an electronic, magnetic, optical, or other physical storage device that contains or stores executable instructions. The memory 510 may be, for example, Random Access memory (RAM), an Electrically Erasable Programmable Read-Only Memory (EEPROM), a storage device, an optical disc, and the like. The memory 510, which may also be referred to as a computer readable storage medium, may be a non-transitory machine-readable storage medium, where the term "non-transitory" does not encompass transitory propagating signals.

The processor 502 may fetch, decode, and execute the instructions 512 to identify features of a surface of a 3D object and/or features of a radiation source 532. The features of the surface of the 3D object may include the type of material used to fabricate the 3D object, a color of the 3D object, or the like. The features of the radiation source 532 may include the type of the radiation source 532, an intensity level at which the radiation source 532 may be operated, a duration at which the radiation source 532 may be operated, or the like. In any regard, the processor 502 may identify the features of the surface and/or the radiation source 532 through receipt of information directed to the features from a user or other source. The features of the surface of the 3D object may also include a detected surface property level of the surface, for instance, as detected by a sensor 416 (FIG. 4).

The processor 502 may fetch, decode, and execute the instructions 514 to identify an intended surface property level of a surface of a 3D object. The processor 502 may identify the intended surface property level in any of the manners discussed above with respect to the instructions 112 and the surface property may similar to the example surface properties discussed above. The intended surface property level of the surface may not be uniform across the surface of the 3D object and thus, different intended surface property levels may be identified different areas of the same surface. Additionally or in other examples, different intended surface property levels may be identified for different surfaces of the 3D object.

The processor 502 may fetch, decode, and execute the instructions 516 to determine a pattern of material to be formed on the surface of the 3D object. The pattern of material to be formed on the surface may depend upon the intended surface property level for the surface. For instance, the pattern of material may be determined to include a certain number of raised bumps or dots of material arranged in a particular pattern such that, when the raised bumps or dots are flashed with radiation, result in the intended surface property level. By way of example, a larger concentration of raised bumps or dots of material may be formed on the surface to increase the surface roughness of the surface or the texture on the surface following application of the flash of radiation. The pattern of material may be determined to be uniform across the surface of the 3D object or to be non-uniform across the surface of the 3D object. Additionally or in other examples, different patterns of material may be identified for different surfaces or sections of a surface of the 3D object.

The processor 502 may fetch, decode, and execute the instructions 518 to control forming components 530 to form the determined pattern of material on the surface of the 3D object. The processor 502 may also control the forming components 530 to form the same or different patterns of material on different surfaces of the 3D object. The forming components 530 may be equivalent to the forming components 414 discussed above. In some examples, the pattern of material may be formed from the same material or materials used to fabricate the 3D object. In addition or in other examples, the material used to form the pattern of material may be a different material from those used to fabricate the 3D object.

In some examples in which the apparatus 500 is a computing device and the forming components 530 are not part of the apparatus 500, the processor 502 may output instructions to a 3D printer that includes the forming components 530. In some examples in which the apparatus is a 3D printer that includes the forming components 530, the processor 502 may output instructions or otherwise control the forming components 530 to form the pattern of material onto the surface of the 3D object. In some examples, the instructions 516 and 518 may be optional, for instance, in instances in which the pattern of material need not be formed to achieve the intended surface property level on the surface of the 3D object.

The processor 502 may fetch, decode, and execute the instructions 520 to access data identifying correlations between the identified features of the surface, the identified features of the radiation source, the identified intended surface property level, an initial surface property level, etc. In some examples, the data may also identify correlations between the intended surface property level and the determined pattern of material. The data identifying the correlations may have been previously determined and stored in the data store 504 or other storage location.

The processor 502 may fetch, decode, and execute the instructions 522 to determine an intensity level, duration, or both at which radiation is to be applied as a pulse or flash of radiation onto the surface of the 3D object to cause the surface to obtain the identified surface property level. Particularly, the processor 502 may access the data correlating the features to the intensity levels, duration, or both at which a flash or pulse of radiation is to be applied to make this determination. That is, the processor 502 may use the correlating data to determine the intensity level, duration, or both at which the radiation source 532 is to apply the flash or pulse of radiation based upon the identified features of the surface and/or the radiation source and the identified intended surface property level. As discussed above, application of the flash of radiation is to cause a thin layer of material at the surface to melt and flow.

The processor 502 may fetch, decode, and execute the instructions 524 to control the radiation source 532 to apply a flash or pulse of radiation at the determined intensity level, duration, or both onto the surface of the 3D object. In some examples, the processor 502 may control the radiation source 532 to apply the flash or pulse of radiation onto the 3D object following fabrication of the 3D object or as a later phase in the fabrication of the 3D object. In some examples, the processor 502 may control the radiation source 532 to apply the flash or pulse of radiation onto the 3D object following formation of the pattern of material on the surface.

Figure 6:
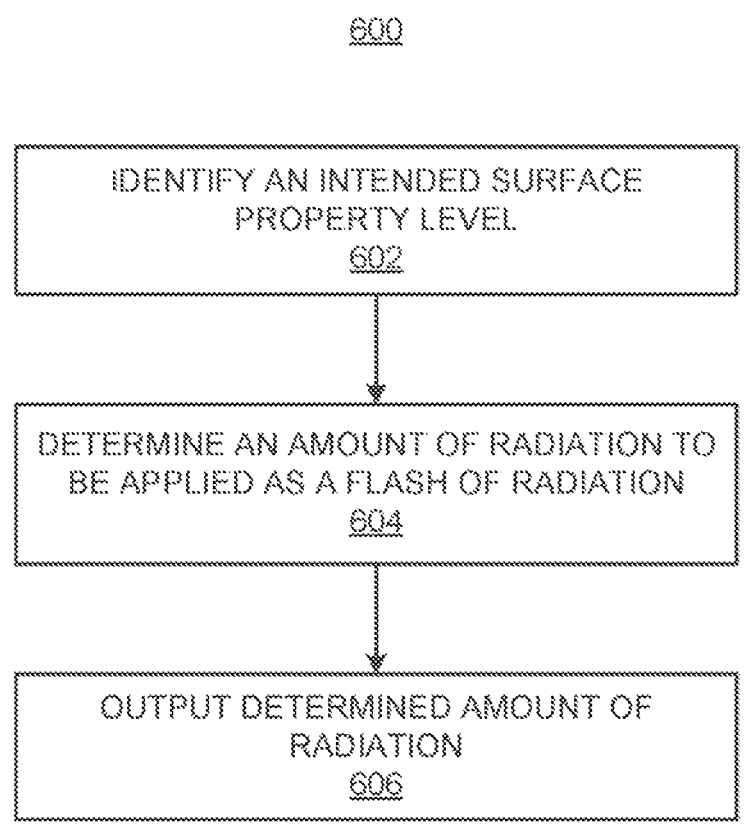
FIGS. 6 and 7, respectively, depict flow diagrams of example methods for determining an amount of radiation to be applied as a flash of radiation onto a 3D object surface to obtain an intended surface property level.
Figure 7:
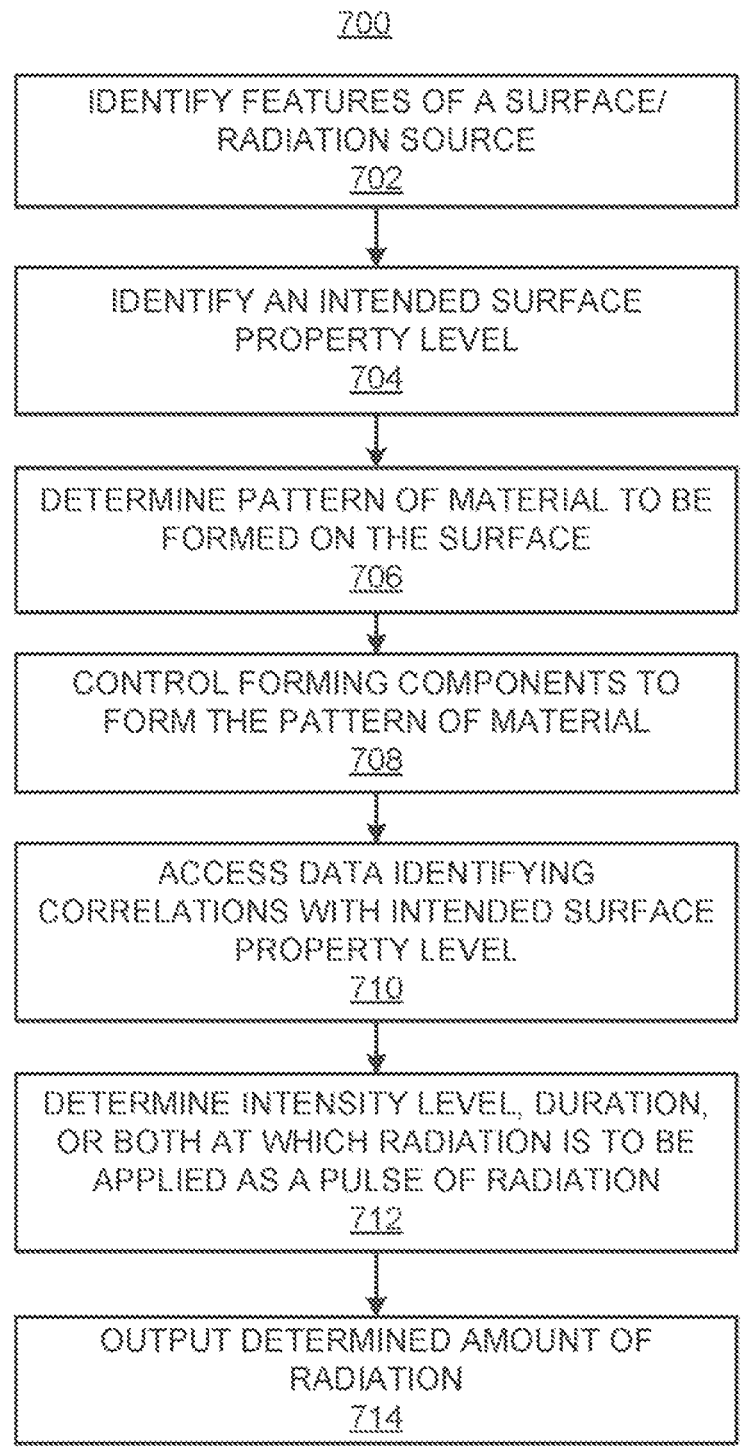

Various manners in which the apparatus 500 may be implemented are discussed in greater detail with respect to the methods 600 and 700 respectively depicted in FIGS. 6 and 7. Particularly, FIGS. 6 and 7, respectively, depict flow diagrams of example methods 600 and 700 for determining an amount of radiation to be applied as a flash of radiation onto a 3D object surface to obtain an intended surface property level. It should be understood that the methods 600 and 700 depicted in FIGS. 6 and 7 may include additional operations and that some of the operations described therein may be removed and/or modified without departing from the scopes of the methods 600 and 700. The descriptions of the methods 600 and 700 are made with reference to the features depicted in FIGS. 4 and 5 for purposes of illustration.

With reference first to FIG. 6, at block 602, the processor 502 may execute the instructions 514 to identify an intended or desired surface property level for a surface of a 3D object. The processor 502 may identify the intended or desired surface property level through receipt of the intended or desired surface property level from a user or other source.

At block 604, the processor 502 may execute the instructions 522 to determine an amount of radiation to be applied as a flash or pulse of radiation onto the surface of the 3D object to achieve the intended or desired surface property level. As discussed herein, the processor 502 may determine the amount of radiation to be applied as a flash or pulse of radiation onto the surface from data that correlates the intended surface property level with features of the 3D object surface. The data may indicate, for instance, for a particular type of 3D object surface having a particular color, different surface property levels resulting from different amounts of application of a flash or pulse of radiation following formation of the 3D object. That is, the data may indicate that a 3D object surface may have a particular surface property level following fabrication of the 3D object and the change to that surface property level resulting from application of different amounts of radiation pulses or flashes.

At block 606, the processor 502 may execute the instructions 524 to output the determined amount of radiation to be applied as a flash or pulse of radiation. In some examples, the processor 502 may output the determined amount of radiation to be applied as a flash or pulse of radiation to a 3D printer having a radiation source 532. In other examples, the processor 502 may control a radiation source 532 to apply the determined amount of radiation as a flash or a pulse of radiation onto a 3D object.

Turning now to FIG. 7, at block 702, the processor 502 may execute the instructions 512 to identify features of a surface of a 3D object and/or features of a radiation source 532. The processor 502 may identify the features of the surface and/or the radiation source 532 through receipt of information directed to the features from a user or other source. The processor 502 may also detect a surface property level of the surface as collected by a sensor 416.

At block 704, the processor 502 may execute the instructions 514 to identify an intended surface property level of a surface of a 3D object. The processor 502 may identify the intended surface property level in any of the manners discussed above with respect to the instructions 112 and the surface property may similar to the example surface properties discussed above.

At block 706, the processor 502 may execute the instructions 516 to determine a pattern of material to be formed on the surface of the 3D object. The pattern of material to be formed on the surface may depend upon the intended surface property level for the surface as discussed above with respect to the instructions 516.

At block 708, the processor 502 may execute the instructions 518 to control forming components 530 to form the determined pattern of material on the surface of the 3D object. As discussed above, the material may be the same material used to fabricate the 3D object surface or may be a different material. Additionally or in other examples, the same pattern or different patterns may be applied to a surface of the 3D object.

At block 710, the processor 502 may execute the instructions 520 to access data identifying correlations between the identified features of the surface, the identified features of the radiation source, the identified intended surface property level, etc. In some examples, the data may also identify correlations between the intended surface property level and the determined pattern of material.

At block 712, The processor 502 may execute the instructions 522 to determine an intensity level, duration, or both at which radiation is to be applied as a pulse or flash of radiation onto the surface of the 3D object to cause the surface to obtain the identified surface property level. Particularly, the processor 502 may make this determination from the data correlating the features to the intensity levels, duration, or both at which a flash or pulse of radiation is to be applied accessed at block 710.

At block 714, the processor 502 may execute the instructions 524 to output the determined amount of radiation to be applied as a flash or pulse of radiation. In some examples, the processor 502 may output the determined amount of radiation to be applied as a flash or pulse of radiation to a 3D printer having a radiation source 532. In other examples, the processor 502 may control a radiation source 532 to apply the determined amount of radiation as a flash or a pulse of radiation onto a 3D object.

Some or all of the operations set forth in the methods 600 and 700 may be contained as utilities, programs, or subprograms, in any desired computer accessible medium. In addition, the methods 600 and 700 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
   detecting a surface property level of a fabricated three-dimensional (3D) object;
   identifying an intended surface property level for the surface of the 3D object, wherein the surface property comprises at least one of roughness, texture, color, gloss, electrical conductivity, electrical resistivity, and tribological properties;
   accessing data identifying correlations between a plurality of surface property levels and flash applied radiation amounts;
   determining, based on the identified correlations and using the detected surface property level as an initial surface property level, an amount of radiation to be applied as a flash of radiation by a radiation source onto the surface that modifies the initial property level to obtain the intended surface property level; and
   outputting to the radiation source the determined amount of radiation to be applied as a flash onto the surface.

2. The method according to claim 1, wherein the correlations are based upon a particular type of the radiation source.

3. The method according to claim 1, further comprising:
   determining, from the intended surface property level, a pattern to be formed on the surface, wherein the pattern contributes to obtaining the intended surface property level on the surface;
   determining the amount of radiation to be applied as the flash of radiation to further cause a material for forming the pattern on the surface to at least partially melt and flow;
   controlling a forming component to form the pattern on the surface using the material; and
   causing the radiation source to apply the determined amount of radiation as the flash of radiation onto the surface of the 3D object, subsequent to forming the pattern, so as to cause the pattern material to at least partially melt and flow.

4. The method of claim 1, wherein the radiation source is one of a xenon lamp, a quartz tungsten halogen lamp, and a laser.

5. The method of claim 1, wherein determining the amount of radiation to be applied comprises determining an intensity level, a duration, or both, at which the radiation is to be flash applied, wherein when the duration is determined, the duration is a time period between about 200 microseconds ($\mu$s) and about 2 seconds (s) depending upon the radiation source.

6. A non-transitory computer readable medium on which is stored machine readable instructions that when executed by a processor cause the processor to:
   identify an intended surface property level for a surface of a fabricated three-dimensional (3D) object, wherein the surface property comprises at least one of roughness, texture, color, gloss, electrical conductivity, electrical resistivity, and tribological properties;
   access data identifying correlations between a plurality of surface property levels and flash applied radiation amounts;
   determine, based upon the identified correlations and using a detected surface property level of the surface as an initial surface property level, an amount of radiation to be applied by a radiation source as a flash of radiation onto the surface that modifies the initial property level to obtain the intended surface property level; and
   output to the radiation source the determined amount of radiation to be applied as flash of radiation.

7. The non-transitory computer readable medium according to claim 6, wherein the instructions further cause the processor to:
   determine an intensity level, a duration, or both at which the radiation is to be applied as a flash of radiation onto the surface based upon the identified correlations in the accessed data.

8. The non-transitory computer readable medium according to claim 6, wherein the instructions further cause the processor to:
   determine, from the intended surface property level, a pattern to be formed on the surface, wherein the pattern contributes to obtaining the intended surface property level on the surface;
   determine the amount of radiation to be applied as the flash of radiation to further cause a material for forming the pattern on the surface to at least partially melt and flow;
   control a forming component to form the pattern of material on the surface; and
   cause the radiation source to apply the determined amount of radiation as the flash of radiation onto the surface of the 3D object, subsequent to forming the pattern, so as to cause the pattern material to at least partially melt and flow.

9. The non-transitory computer readable medium according to claim 6, wherein the instructions further cause the processor to:
   determine an intensity level, a duration, or both, at which the radiation is to be applied as flash of radiation, wherein when the duration is determined, the duration is a time period between about 200 microseconds ($\mu$s) and about 2 seconds (s) depending upon the radiation source.

10. A system comprising:
    a radiation source that applies radiation;
    a processor;
    a sensor that collects data associated with a surface of a fabricated three-dimensional (3D) object and communicates the data to the processor; and
    a memory that stores machine readable instructions that cause the processor to:
    identify an intended surface property level for the surface of the 3D object, wherein the surface property comprises at least one of roughness, texture, color, gloss, electrical conductivity, electrical resistivity, and tribological properties;

using the data collected by the sensor, determine a detected surface property level of the surface;

access data identifying correlations between a plurality of surface property levels and flash applied radiation amounts;

determine, based upon the identified correlations and using the detected surface property level as an initial surface property level, an amount of radiation to be applied as a flash of radiation onto the surface that modifies the initial surface property level to obtain the intended surface property level; and cause the radiation source to apply the determined amount of radiation as the flash of radiation onto the surface of the 3D object.

11. The system of claim 10, wherein, to determine the amount of radiation to be applied, the memory that stores machine readable instructions causes the processor to: determine an intensity level, a duration, or both, at which the radiation is to be flash applied, wherein when the duration is determined, the duration is a time period between about 200 microseconds (μs) and about 2 seconds (s) depending upon the radiation source.

12. The system claim 10, wherein the memory that stores machine readable instructions causes the processor to: cause the radiation source to apply the determined amount of radiation, wherein the radiation source is one of a xenon lamp, a quartz tungsten halogen lamp, and a laser.

13. The system of claim 10, wherein the correlations are based upon a particular type of the radiation source.

14. The system of claim 10, wherein the memory that stores machine readable instructions causes the processor to:

using the data collected by the sensor, identify a color of the surface in addition to the detected surface property level of the surface; and access data identifying correlations between the plurality surface property levels, flash applied radiation amounts, and colors;

wherein determining the amount of radiation to be applied as the flash of radiation onto the surface is further based upon the correlations identified between the plurality of surface property levels, flash applied radiation amounts, and colors.

15. The system of claim 10, wherein the memory that stores machine readable instructions causes the processor to:

determine, from the intended surface property level, a pattern to be formed on the surface, wherein the pattern contributes to obtaining the intended surface property level on the surface;

determine the amount of radiation to be applied as the flash of radiation to further cause a material for forming the pattern on the surface to at least partially melt and flow;

control a forming component to form the pattern on the surface using the material; and cause the radiation source to apply the determined amount of radiation as the flash of radiation onto the surface of the 3D object, subsequent to forming the pattern, so as to cause the pattern material to at least partially melt and flow.

16. The system of claim 10, wherein the intended surface property level has a surface roughness value that is greater than a surface roughness value of the detected surface property level.

17. The system of claim 10, wherein the intended surface property level has a surface roughness value that is less than a surface roughness value of the detected surface property level.

18. The system of claim 10, wherein the intended surface property level is a texture that is different from a texture of the detected surface property level.

* * * * *